United States Patent

Chiba

[11] Patent Number: 6,052,395
[45] Date of Patent: Apr. 18, 2000

[54] PULSE LASER

[75] Inventor: Teiichiro Chiba, Hiratsuka, Japan

[73] Assignee: Komatsu, Ltd., Tokyo, Japan

[21] Appl. No.: 08/952,281

[22] PCT Filed: May 13, 1996

[86] PCT No.: PCT/JP96/01256

§ 371 Date: Nov. 17, 1997

§ 102(e) Date: Nov. 17, 1997

[87] PCT Pub. No.: WO96/36857

PCT Pub. Date: Nov. 21, 1996

[30] Foreign Application Priority Data

May 19, 1995 [JP] Japan ................................. 7-121636

[51] Int. Cl.[7] .................................................. H01S 3/10
[52] U.S. Cl. ........................................ 372/25; 372/38
[58] Field of Search ................................. 372/25, 38

[56] References Cited

U.S. PATENT DOCUMENTS 4,807,239  2/1989  Takano et al. ............................ 372/25

FOREIGN PATENT DOCUMENTS 01124722  5/1989  Japan .
01126629  6/1989  Japan .
1099033   4/1998  Japan .

Primary Examiner—Rodney Bovernick
Assistant Examiner—Robert E. Wise
Attorney, Agent, or Firm—Welsh & Katz, Ltd.

[57] ABSTRACT

A pulse laser which outputs a pulsed laser beam, comprises a delaying means which delays the timing of shift from off to on of a laser output timing signal which is turned on during the output period of the pulse laser for the time required to output one laser pulse and an average output measuring means which measures the average output of the pulse laser while the laser output timing signal is on. The average output of the pulse laser is accurately measured by eliminating the influence of giant pulses.

4 Claims, 4 Drawing Sheets

FIG.3(b)  FIG.3(c)

PULSE LASER

TECHNICAL FIELD

The present invention is related to an improvement in a pulse laser, which generates a pulsed laser beam, for enabling the accurate measurement of laser output by removing the extremely large influence on a pulsed laser beam of the energy generated during the first pulse.

BACKGROUND ART

In a Q-switch laser, laser oscillation is suppressed by incorporating a special kind of shutter (Q switch) inside an optical resonator so that when a large amount of energy has been built up in the laser medium and this Q switch is opened, a single pulsed laser with a short pulse width and a high peak value can be realized. Therefore, by opening and closing a Q switch at a suitable cycle, it is possible to achieve a pulsed laser beam which is generated intermittently in synch with this cycle.

In a Q-switch laser, which generates a cyclic pulsed laser beam like this, as shown in FIG. 4, the first pulsed laser after the release of laser output stoppage (hereafter referred to as a giant pulse) consists of an extremely larger amount of energy than the second and subsequent pulsed lasers, and if this giant pulse is used as-is for processing, it causes processing defects. For this reason, in the various processing devices that utilize this kind of Q-switch laser, a variety of contrivances have been devised so that this giant pulse is not used to carry out processing.

For example, IN a laser marking device, which displays a required marking pattern on a liquid crystal mask, and marks a product number, manufacturing date, lot number and serial number on integrated circuit (IC) packages by irradiating a laser beam through this liquid crystal mask onto the IC package to be processed, a laser scatterer is provided at the edges of the liquid crystal mask, so that by directing the giant pulse at this laser scatterer, the giant pulse is scattered, and the giant pulse is not used in the marking process.

Meanwhile, there is a close relationship between laser output value and processing quality in various processing equipment which utilize the Q-switch laser described above. Monitoring laser output is important for maintaining process quality. Furthermore, this laser output value is an important parameter for determining the service life of various expendable items.

Thus, this type of Q-switch laser is ordinarily equipped with an average value measurement function, which measures the average output of a pulsed laser. As the prior art thereof, there is the Japanese Patent Application Laid-open No.1-124722.

In this prior art, the average output of a Q-switch pulse laser is measured by multiplying the peak value (peak value) of a pulsed laser beam and the half-value width of a pulsed laser beam by the frequency of a Q-switched laser pulse.

However, with this prior art, since the above-described giant pulse is not taken into consideration when measuring the average output, an accurate average value measurement cannot be made when this prior art is utilized in processing equipment in which giant pulses are not used to perform processing. This results in problems which adversely affect process quality and the determination of expendable item service life.

Furthermore, there are problems in the above-described prior art. Because a portion of a laser output is isolated via a beam splitter, and this isolated laser beam is attenuated via an attenuator, the average output of the laser is sought based on this attenuated laser beam. This reduces the laser output used in processing, making it impossible to utilize laser output efficiently. Another problem is that because of the existence of a beam splitter and attenuator, the laser device has a complex configuration and is costly.

With the foregoing in view, it is an object of the present invention to provide a pulse laser, which accurately measures the average output of a pulsed laser by eliminating the influence of giant pulses.

It is also an object of the present invention to provide a pulse laser, which is capable of measuring the average laser output using a simple configuration that does not reduce the laser output used in processing.

DISCLOSURE OF THE INVENTION

In the present invention, a pulse laser, which outputs a pulsed laser beam, comprises: delaying means for delaying a timing of a shift from OFF to ON of a laser output timing signal, which is ON for a duration of a pulsed laser output, by a predetermined time required to output a first pulsed laser; and average output measuring means for measuring an average output of the pulsed laser beam during a period when the laser output timing signal output via the delaying means is ON.

By virtue of the present invention, the timing of the shift from OFF to ON of a laser output timing signal, which is ON for the duration of a pulsed laser output, is delayed by a delaying means for the predetermined time required to output a first pulsed laser (giant pulse), and the average output of a pulsed laser is measured during the period when the above-described laser output timing signal output via the delaying means is ON. This enables the influence of a giant pulse to be eliminated, and the average output of a pulsed laser to be measured.

Therefore, since the present invention eliminates the influence of a giant pulse and measures the average output of a pulsed laser, when the present invention is used in processing equipment, in which processing is not implemented using a giant pulse, laser output can be accurately measured, thus making it possible to accurately determine the processing precision and the service life of expendable items affected by laser output. Further, since the average laser output is measured only when laser output is utilized with a laser output timing signal, the average value of emitted laser output can be measured accurately at least at arbitrary intervals and arbitrary timing.

Further, in the present invention, a pulse laser, which outputs a pulsed laser beam, also comprises: laser reflecting means for reflecting an outgoing pulsed laser beam; laser receiving means for receiving laser scattered light from the laser reflecting means; and laser output measuring means for measuring the pulsed laser output using the laser scattered light received by the laser receiving means.

By virtue of the present invention, the output of a pulsed laser is measured by using the laser scattered light from the laser reflecting means.

Therefore, in the present invention, since laser output is measured using the scattered light of a pulsed laser, the beam splitter and attenuator found in prior art are not needed, making it possible to simplify the laser device configuration and lower costs, and also enabling the realization of the efficient use of laser output, without having to weaken the originally-intended laser output for the purpose of laser output measurement.

BEST MODE FOR CARRYING OUT THE INVENTION

The following is a detailed explanation of the preferred embodiment of the present invention in accordance with the attached figures.

Figure 1:
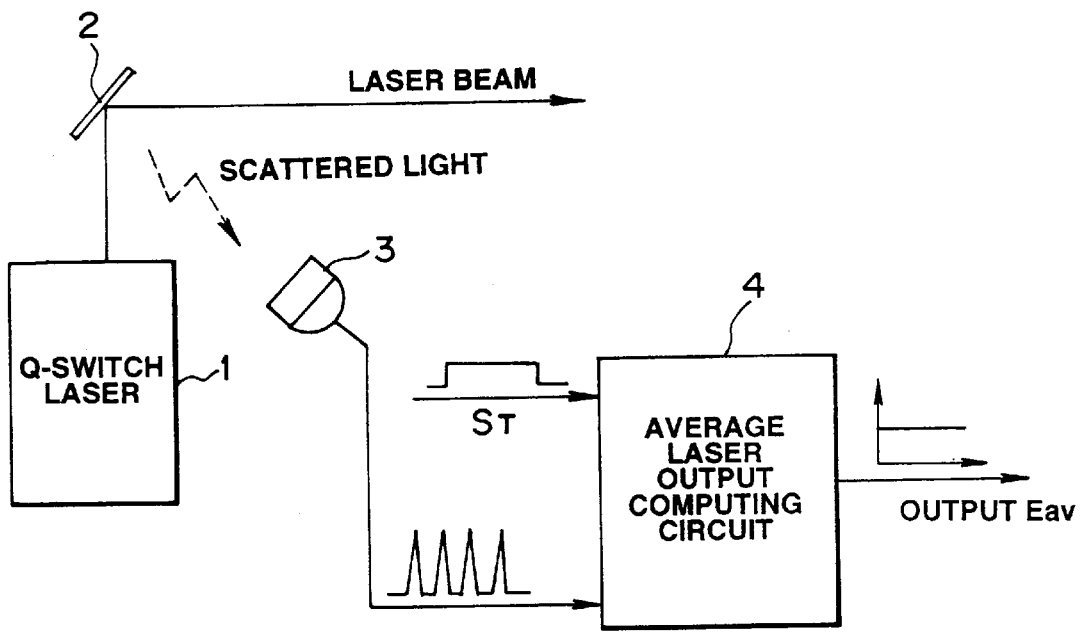
FIG. 1 is a block diagram of an embodiment of the present invention.

FIG. 1 depicts a preferred embodiment of the present invention, wherein a Q-switched pulsed laser output from a Q-switch laser 1 is emitted after being reflected by a reflecting mirror 2, and is input to processing equipment not shown in the figure. The processing equipment uses the input laser beam to carry out required processing.

Meanwhile, the Q-switched pulsed laser output from the Q-switch laser 1 is scattered by the reflecting mirror 2. A photodetector 3 detects this scattered light, and is positioned so as to be able to detect the scattered light from the reflecting mirror 2.

In this embodiment, average laser output is measured using the scattered light detected by the above-described photodetector 3.

The scattered light detected by the photodetector 3, and a laser output timing signal $S_T$ are input to an average laser output computing circuit 4, and this average laser output computing circuit 4 uses these input signals to compute and output the average laser output. Also, the laser output timing signal $S_T$ stays ON during the period when a pulsed laser (including a first giant pulse as well) is being output.

Figure 2:
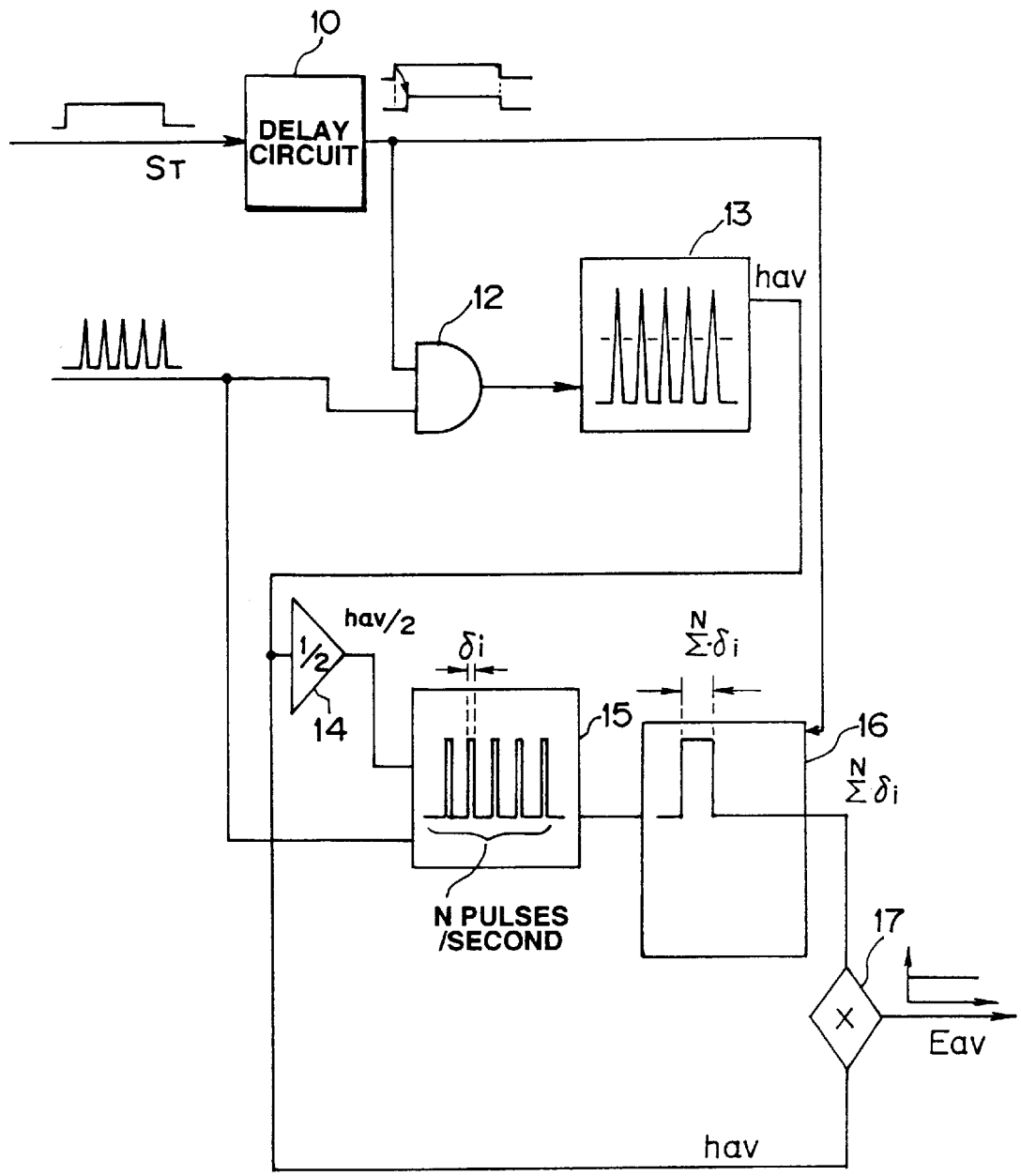
FIG. 2 is a block diagram illustrating the detailed configuration of an average laser output computing circuit.

FIG. 2 depicts the internal configuration of the average laser output computing circuit 4. Prior to explaining the circuit configuration depicted in FIG. 2, an overview of the method of computing the average output of a pulsed laser is explained using FIG. 3.

Figure 3A:
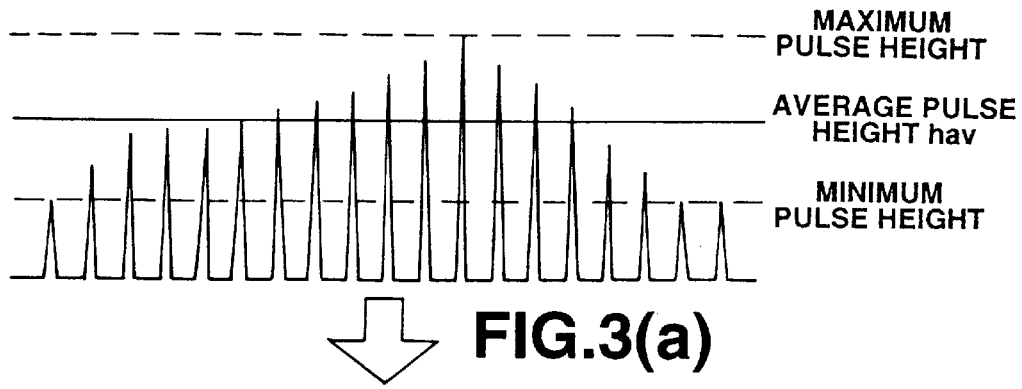
FIG. 3 is a method for finding the average output of a pulse laser.
Figure 3D:
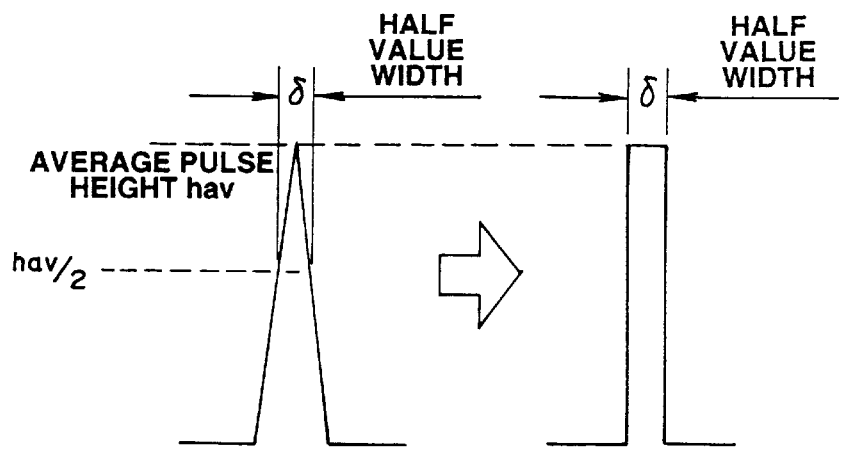
Figure 3D:
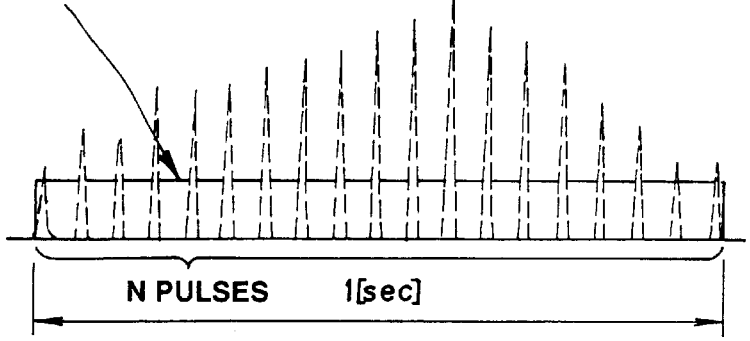
Figure 4:
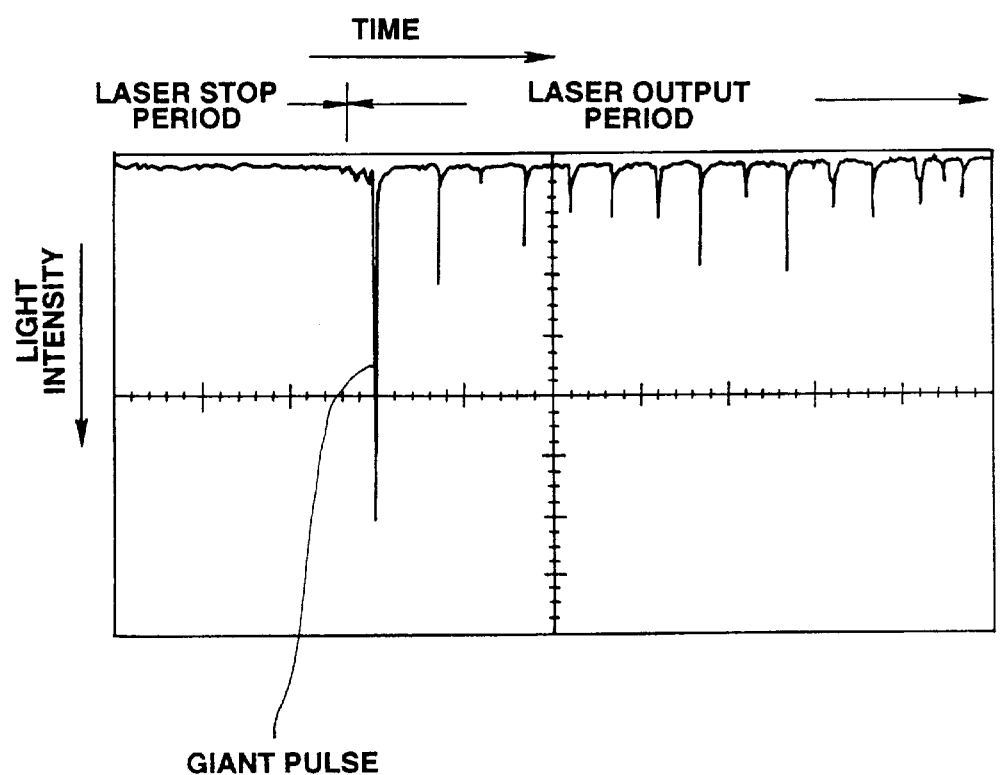
FIG. 4 is a giant pulse generated by a pulse laser.

With a Q-switched pulsed laser, as shown in FIG. 3, each laser pulse forms an abbreviated triangular waveform, and the per-unit-of-time integral values of these pulse waveforms are treated as the average output of a pulsed laser.

Firstly, since the peak value of each pulse waveform varies, the average pulse height hav per unit of time (1 second, for example) is found for each of these peak values (FIG. 3(a)). Next, the pulse width of half hav/2 of this average pulse height hav, that is, the half-value width δi, is calculated for each pulse. (FIGS. 3(b)(c)). Then, the cumulative values of the half-value width δi per unit of time δ1+δ2+ . . . +δN are calculated. Provided that N represents the number of pulses per unit of time. Then, the average output of a pulsed laser per unit of time Eav is found in accordance with the following formula (FIG. 3(d)).

$$Eav=hav\ (δ1+δ2+ \ldots +δN)$$

The above processing is performed for each unit of time that passes.

The above-described computational process is performed in the average laser output computing circuit 4 depicted in FIG. 2.

In FIG. 2, the scattered light of the Q-switched pulsed laser detected by the photodetector 3 depicted in FIG. 1 is input to a giant pulse elimination circuit 12 and a half-value width computing circuit 15.

Further, the laser output timing signal $S_T$, which is ON during the period when a pulsed laser is being output, is input to a delay circuit 10. The delay circuit 10 is set so as to delay the timing of the rise of the laser output timing signal $S_T$ from OFF to ON only for the prescribed time required to output a first pulsed laser (that is, the output of the giant pulse). Also, this delay circuit 1 (10) does not carry out a delay operation related to the timing at which the laser output timing signal $S_T$ falls from ON to OFF. The laser output timing signal $S_T$ output from the delay circuit 10 is input to the giant pulse elimination circuit 12.

The giant pulse elimination circuit 12 operates so as to output only those laser pulses of the Q-switched laser pulses detected by the photodetector 3 while the laser output timing signal $S_T$ input via the delay circuit 10 is ON. Therefore, the first giant pulse is eliminated by the giant pulse elimination circuit 12, and second and subsequent laser pulses are output.

An average peak height computing circuit 13 finds the per-unit-of-time average value of the peak values, that is, the average pulse height hav, of second and subsequent laser pulses input from the giant pulse elimination circuit 12, and outputs the value hav found to a ½ computing circuit 14 (See FIG. 3(a)).

The ½ computing circuit 14 finds one-half hav/2 of the average pulse height hav, and inputs this value hav/2 to a half-value width computing circuit 15.

The half-value width computing circuit 15 calculates for each laser pulse the pulse width at the pulse height hav/2 of each laser pulse, that is, the half-value width δi, and outputs these calculated values δi to a half-value width accumulator 16 (See FIGS. 3(b)(c)).

The half-value width accumulator 16 calculates the cumulative value δ1+δ2+ . . . +δN of half-value widths per unit of time δi. N is the number of pulses per unit of time. Here, the laser output timing signal $S_T$ delayed in the above-mentioned delay circuit 10 is input to the half-value width accumulator 16, and of the various half value width values δi input from the half-value width computing circuit 15, the half-value width accumulator 16 selects only those half-value widths that are included in the period when the laser output timing signal $S_T$ is ON, and operates on the per-unit-of-time cumulative value thereof. Therefore, the giant pulse element is eliminated from the cumulative value δ1+δ2+ . . . +δN of half-value widths operated on by the half-value width accumulator 16.

A multiplier 17 multiplies the cumulative value δ1+δ2+ . . . +δN of half-value widths output from the half-value width accumulator 16 by the average pulse height hav output from the average peak height computing circuit 13. This makes it possible to find the average output of a pulsed laser per unit of time Eav (=hav (δ1+δ2+ . . . +δN)).

Each circuit in FIG. 2 repeats the above-described processing for each unit of time. This enables the average output of pulsed lasers Eav to be output for each unit of time.

In this way, the above-described embodiment eliminates the giant pulse that is output first and finds the average output of pulsed lasers. For this reason, when the present invention is used in processing equipment that does not use giant pulses to perform processing, it is possible to accurately measure laser output.

Further, since the influence of giant pulses is eliminated, the degree of amplification of each of the electronic circuits depicted in FIG. 2 can be greatly increased, thus enabling laser output measurement using scattered light, the detected light intensity of which is relatively weak.

INDUSTRIAL APPLICABILITY

The present invention is advantages for enabling accurate laser output measurement in a pulse laser, which generates a pulsed laser beam.

I claim:

1. A pulsed laser control device, comprising:

means for generating a laser pulse signal corresponding to an energy of an outgoing laser pulse;

means for generating a laser output timing signal which controls a start time and an end time of laser oscillation;

delay means for receiving the laser output timing signal and obtaining a signal which is at a first level for a predetermined period of time from the oscillation start time and is at a second level during a period after the lapse of the predetermined period of time until the oscillation end time; and a logic circuit which receives the laser pulse signal and the signal from the delay means, which does not output the laser pulse signal during the predetermined period of time from the oscillation start time, and which outputs the laser pulse signal only during the period after the lapse of the predetermined period of time until the oscillation end time.

2. The pulsed laser control device according to claim 1, wherein the means for generating the laser pulse signal comprises:

laser reflecting means for reflecting part of an outgoing pulsed laser beam; and a photo detector for receiving laser scattered light from the laser reflecting means and outputting the laser pulse signal.

3. A pulsed laser control device, which controls a laser pulse output, comprising:

delaying means for delaying a timing of a shift from OFF to ON of a laser output timing signal, which is ON for a duration of the laser pulse output, by a predetermined time during which a first giant pulse is output;

a giant pulse eliminating circuit for receiving the laser output timing signal from the delaying means, outputting only laser pulse signals that are in a period when the laser output timing signal is ON, and eliminating a giant pulse signal;

an average peak height calculating circuit for outputting an average value per unit of time of peak values of a second and following laser pulse signals received from the giant pulse eliminating circuit;

a half value width calculating circuit for calculating a half-value width of each laser pulse signal on the basis of the average value per unit of time of the peak values of the laser pulse signals output from the average peak height calculating circuit;

a half value width accumulating circuit for selecting only half-value widths that are included in the period when the laser output timing signal is ON, from among the half-value widths input from the half-value calculating circuit, and calculating a cumulative value per unit of time of the selected half-value widths; and multiplying means for multiplying the cumulative value of the half-value widths output from the half value width accumulating circuit and the average pulse height output from the average peak height calculating circuit, wherein an average output energy of the pulse laser is measured in the period when the laser output timing signal output through the delaying means is ON.

4. The pulsed laser control device according to claim 3, further comprising:

laser reflecting means for reflecting part of an outgoing pulsed laser beam; and laser receiving means for receiving laser scattered light from the laser reflecting means, wherein the giant pulse eliminating circuit, by using the laser scattered light received by the laser receiving means, outputs only the laser pulse signals in the period when the laser output timing signal is ON and eliminates the giant pulse signal.

* * * * *